UNITED STATES PATENT OFFICE.

JAMES HALPEN, OF VISALIA, CALIFORNIA.

IMPROVEMENT IN MEDICAL COMPOUNDS OR LINIMENTS.

Specification forming part of Letters Patent No. 149,857, dated April 21, 1874; application filed January 21, 1874.

*To all whom it may concern:*

Be it known that I, JAMES HALPEN, of the town of Visalia, Tulare county, State of California, have invented a certain compound for the treatment and cure of scab and mange on sheep, of which the following is a specification:

My invention relates to that class of compounds that are applied externally as lotions or washes, which, by their invigorating and medical properties, produce a healthy action, so as to cure all kinds of sores and stimulate the parts effected into renewed life.

To prepare this lotion or wash, take one-half pound of corrosive sublimate, one pound of white vitriol, one-half pound of niter, two ounces of sal-ammoniac, and two ounces of arsenic. Powder the whole, and thoroughly incorporate the compound by dissolving it in a mixture of one pint of spirits of turpentine in five gallons of tobacco-water. The compound thus prepared is not liable to deteriorate by age, and in using it it is only necessary to apply it to the parts affected in the same manner as any other lotion, the sores or scabs on sheep being immediately attacked by it, leaving the flesh or skin in better condition than the surrounding parts, that are not materially diseased, in a certain time, according to the progress the disease has made previous to the application. Each of these ingredients composing this compound exerts a beneficial effect on the ulcerated skin to which they may be applied, so that, conjointly, they effect the object desired with more energy, and in a much shorter period of time; for the corrosive sublimate acts as a stimulant and escharotic, and is a well-known salve for all kinds of scaly and other eruptions; the white vitriol is a powerful astringent for indolent sores; the sal-ammoniac serves to resolve tumors; the niter, being of a refrigerant tendency, checks all inflammatory symptoms; the arsenic particularly acts on the skin for all sorts of ulcers, &c., while the turpentine stimulates the parts into a healthy state, and the tobacco-water, being both a sedative and narcotic, relieves pain in all cutaneous affections, by reason of its anodyne properties.

I claim as my invention—

A compound, consisting of corrosive sublimate, white vitriol, niter, sal-ammoniac and arsenic, incorporated in a mixture of spirits of turpentine and tobacco-water, substantially as and for the purposes specified.

JAMES HALPEN.

Witnesses:
JOHN G. KNOX,
W. F. THOMAS.